United States Patent [19]

Shimizu et al.

[11] Patent Number: 4,879,077
[45] Date of Patent: Nov. 7, 1989

[54] CONTROL METHOD OF INJECTION MOLDING MACHINE

[75] Inventors: Junichi Shimizu; Tadashi Nakajoh, both of Nagano, Japan

[73] Assignee: Nissei Jushi Kogyo Kabushiki Kaisha, Nagano, Japan

[21] Appl. No.: 216,503

[22] Filed: Jul. 8, 1988

[30] Foreign Application Priority Data

Feb. 29, 1988 [JP] Japan ................................. 63-46853

[51] Int. Cl.⁴ ............................................. B29C 45/50
[52] U.S. Cl. ................................ 264/40.1; 264/328.1; 425/145; 425/587
[58] Field of Search .................... 264/40.1, 40.3, 40.5, 264/40.7, 211.21, 328.1, 328.8, 328.11, 349; 425/135, 145, 146, 147, 149, 150, 587

[56] References Cited

U.S. PATENT DOCUMENTS

| 4,042,660 | 8/1977 | Bishop | 264/328.8 |
| 4,540,359 | 9/1985 | Yamazaki | 425/135 |
| 4,592,712 | 6/1986 | Gutjahr | 425/145 |
| 4,649,262 | 3/1987 | Yoshikawa | 425/144 |

Primary Examiner—Jan H. Silbaugh
Assistant Examiner—Jill L. Heitbrink
Attorney, Agent, or Firm—Birch, Stewart, Kolasch & Birch

[57] ABSTRACT

A control method of an injection molding machine is implemented so that a screw is rotated at a predetermined speed in the reverse direction to a rotational direction in a measuring process in the whole or partial stroke of an injection process in the case where an in-line screw type injection molding machine is controlled. With the control method, when the screw is moved forward in the injection process, apparent position of a ridge of the screw in a predetermined position of a heating cylinder becomes stationary.

3 Claims, 3 Drawing Sheets

CONTROL METHOD OF INJECTION MOLDING MACHINE

FIELD OF THE INVENTION

The present invention relates to a control method of an injection molding machine, and more particularly to a control method of controlling a screw in an injection process.

DESCRIPTION OF THE RELEVANT ART

A conventional injection molding machine of an in-line screw type includes, as disclosed in U.S. Pat. No. 4,540,359, a heating cylinder which is disposed in a rear portion thereof and is provided with a hopper for feeding material to be molded and a screw which is inserted into the heating cylinder and is controlled to be moved into and out from the heating cylinder and to be rotated. In a measuring process, the screw is rotated to gather molten resin material in the front of the screw and in an injection process the screw is moved forward to inject the molten resin into a mold and fill the mold with the molten resin. Accordingly, in the injection molding machine of this type, in order to obtain a stable molded product with high accuracy and high quality, it is very important to control the injection speed and injection pressure (holding pressure) exactly.

The injection molding machine of the in-line screw type described above has the following problems.

One problem is caused by the material to be molded. As shown in FIG. 6, a screw 61 is inserted into a heating cylinder 62, and material W to be molded is fed into the heating cylinder 62 from a material feeding path (hopper) 63 formed in the heating cylinder 62 perpendicularly to an axial direction of the screw 61. In the case where the material W is solid material (pellets) having large hardness such as acrylic resin, polycarbonate resin, resin containing glass and the like and the depth of a groove 61d of the screw 61 is shallower than the size of the material W, the solid material in the groove 61d is cut between a lower end 64 of the material feeding path 63 and a thread ridge 61h of the screw 61 when the screw 61 is moved forward (in the direction of arrow). The cutting force is about 100 to 500 kg which is different depending on a diameter of the screw 61. Accordingly, the cutting force encounters a large resistance in the case of a small injection molding machine having an injection output of about several tons.

Further, the position where the screw stops after measurement in the measuring process, that is, the position of the screw 61 in the rotational direction at the beginning of the injection is also different for each molding cycle. Accordingly, the configuration, density and quantity of the material W are different and hence the mechanical resistance applied to the screw 61 is varied for each shot.

On the other hand, it is ideal that a pressure of resin in a cavity of a mold can be detected directly, while a pressure sensor is generally provided on the side of a drive mechanism since it is technically difficult to detect the pressure of the resin in the cavity of the mold. For example, as disclosed in Japanese Patent Unexamined Publication No. 60-174625, a hydraulic injection molding machine includes a pressure sensor such as a hydraulic sensor which detects a pressure of oil in the injection cylinder and further a motor-driven injection molding machine includes a pressure sensor such as a load cell (strain gauge) which detects a reaction force of the screw. Thus, a closed-loop control is effected so that the detection signal (detection value) of the pressure sensor is equal to a set value of the injection pressure (holding pressure).

However, with such pressure detection as described above, the mechanical resistance based on the material W in the vicinity of the material feeding path described above is detected in addition to the pressure of the molten resin material existing in the front of the screw 61. Consequently, variation of the resistance affects the detection value of the pressure sensor directly and the pressure of the molten resin can not be detected exactly regardless of the closed-loop control, whereby a stable molded product with high quality and high accuracy can not be obtained.

SUMMARY OF THE INVENTION

It is an object of the present invention to provide a control method of an injection molding machine which avoids the problem that material to be molded is cut between a screw and a material feeding path and reduces variation of pressure for each shot to control injection and holding pressure stably so that a molded product with high quality and high accuracy can be obtained.

It is another object of the present invention to provide a control method of an injection molding machine which can reduce a mechanical resistance between a screw and an inner wall of a heating cylinder due to material to be molded and further reduce variation of a mechanical resistance for each molding cycle to detect exact pressure which is substantially identical with pressure of resin within a cavity of a mold even by an indirect pressure detection method using a hydraulic pressure sensor or a load cell.

It is still another object of the present invention to provide a control method of an injection molding machine which can reduce a mechanical resistance between a screw and an inner wall of a heating cylinder to reduce power loss based on the mechanical resistance.

In order to achieve the above objects, according to the present invention, a basic feature in controlling the injection molding machine resides in that a screw 2 is rotated at a predetermined speed r in the reverse direction to a rotational direction during a measuring process in the whole or partial stroke of an injection process in which the screw 2 is moved forward. The predetermined speed r (rotation/second) can be set by, for example, $r = Vs/L$, where Vs is a forward moving speed of the screw and L is a pitch (mm) of the screw. An apparent position of a ridge 2h or a groove 2d of the screw 2 in an axial direction can be detected to feedback-control the magnitude of the predetermined speed r so that the apparent position of the ridge 2h or the groove 2d of the screw 2 is maintained constant on the basis of the detected position.

With such a control method, since the screw 2 is rotated in the reverse direction to the rotational direction in the measuring process at the same time when the screw 2 is moved forward in the injection process, the apparent position of the ridge 2h or groove 2d of the screw 2 in a predetermined position of the heating cylinder becomes substantially stationary (slight backward movement from this position can be allowed).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art for this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

An embodiment of the present invention is now described in detail with reference to the drawings.

In order to facilitate the understanding of the present invention, a configuration of an in-line screw type injection molding machine is described with reference to FIG. 1.

Figure 1:
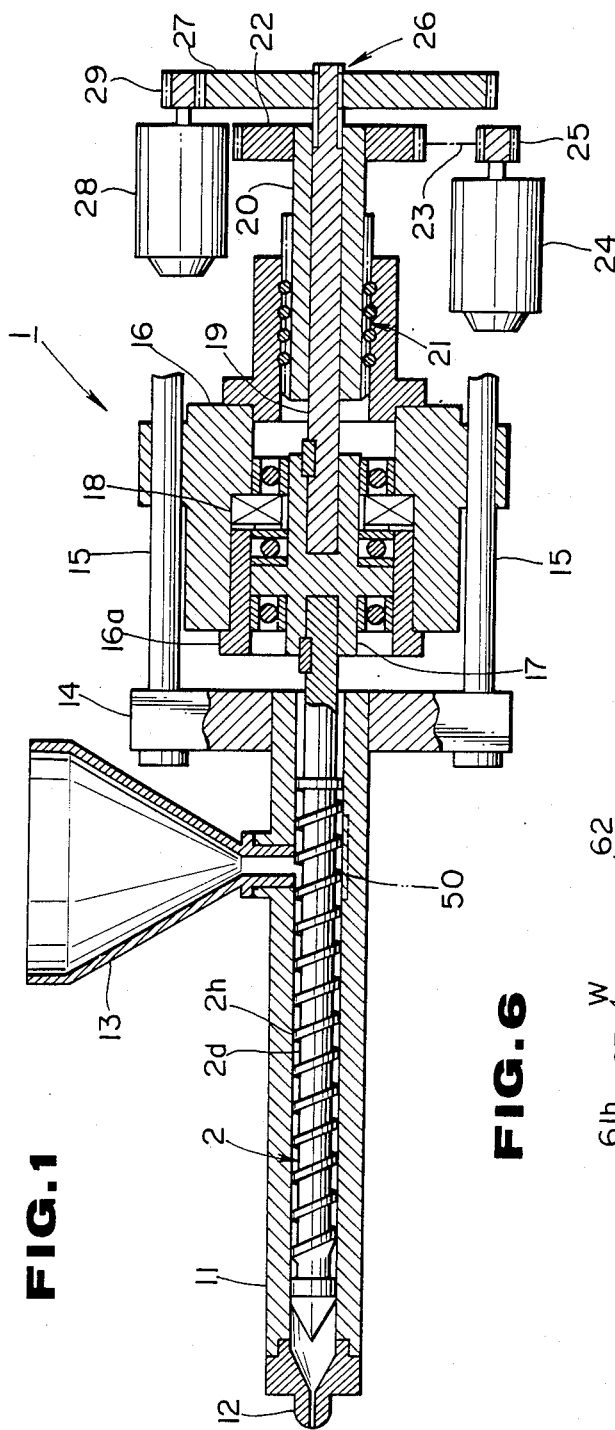
FIG. 1 is a sectional view showing an injection apparatus of an injection molding machine without a mold which can implement a control method according to the present invention.
Figure 6:
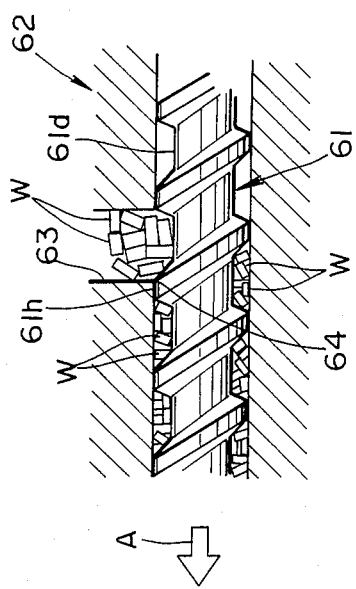
FIG. 6 is a sectional view showing the vicinity of a hopper of an injection apparatus for illustrating problems in prior art arrangements.

Referring to FIG. 1, a heating cylinder 11 includes an injection nozzle 12 formed at a front end thereof and a hopper 13 disposed on a rear portion thereof to feed material to be molded into the heating cylinder 11. A screw 2 is inserted into the heating cylinder 11. A rear end of the heating cylinder 11 is supported by a support plate 14 which is provided with a plurality of tie-bars 15 extending backward horizontally. The tie-bars 15 support a sliding member 16 which is slidably moved in the forward and backward directions. A nonrotatable member 16a which is allowed to be moved in the forward and backward directions is inserted into the sliding member 16. A coupling member 17 is rotatably mounted in the nonrotatable member 16a. A ring load cell 18 is mounted between a rear end surface of the coupling member 17 and the sliding member 16. A front end of the coupling member 17 is coupled with a rear end of the screw 2 and a rear end of the coupling member 17 is coupled with an inner shaft member extending backward. A cylindrical outer shaft member 20 is rotatably inserted into the inner shaft member 19 concentrically thereto. A ball screw mechanism 21 for injection is mounted between an outer periphery of the outer shaft member 20 and the sliding member 16. A driven gear 22 is mounted to a rear end of the outer shaft member 20 and is coupled through a timing belt 23 with a drive gear 25 mounted to a servomotor 24 for injection. On the other hand, a driven gear 27 is mounted to a rear end of the inner shaft member 19 through a spline mechanism 26 and is meshed with a drive gear 29 mounted to a servomotor 28 which rotates the screw.

An injection apparatus 1 of the injection molding machine is configured as described above and is operated as follows.

When the servomotor 28 is rotated in the normal direction, the rotatory power of the motor 28 is transmitted through the drive gear 29, the driven gear 27, the spline mechanism 26, the inner shaft member 19 and the coupling member 17 to the screw 2 so that the screw 2 is rotated in the normal direction and molten resin can be measured. If the motor 28 is rotated in the reverse direction, the screw 2 can be reversely rotated through the same route.

On the other hand, when the servomotor 24 is rotated in the normal direction, the rotatory power of the motor 24 is transmitted through the drive gear 25, the driven gear 22, the outer shaft member 20, the ball screw mechanism 21 and the sliding member 16 to the coupling member 17. Accordingly, the screw 2 can be moved forward to inject the measured molten resin into the mold and fill the mold with the molten resin. If the motor 24 is reversely rotated, the screw 2 can be moved backward through the same route.

Figure 2:
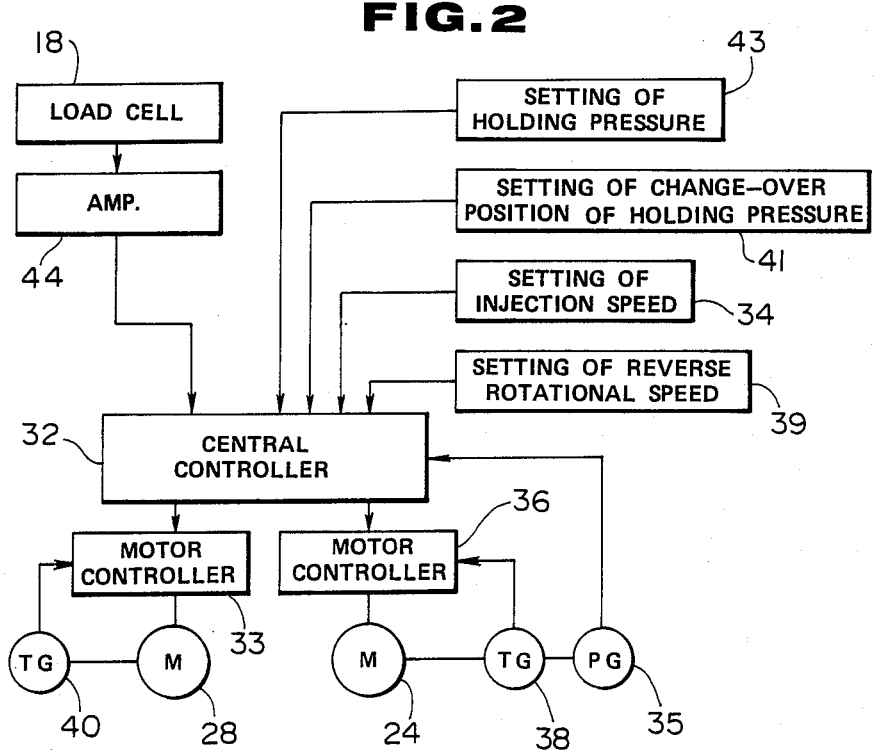
FIG. 2 is a block diagram showing only a main portion of a controller implementing a control method according to the present invention.
Figure 3:
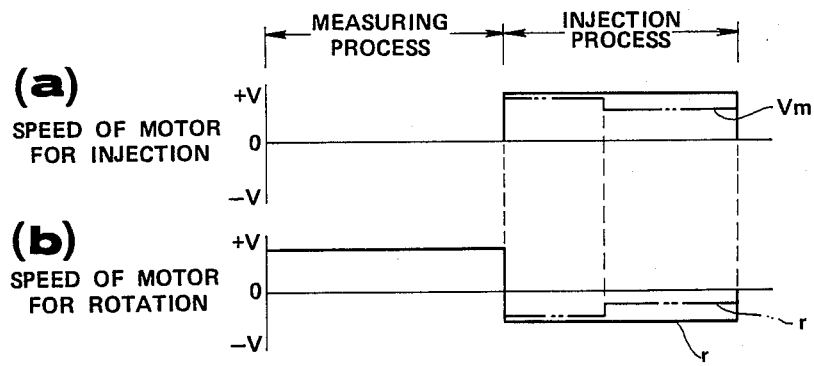
FIG. 3 is a timing chart of motors in a measuring process and an injection process controlled by a control method according to the present invention.

The control method of the injection molding machine according to the present invention is now described with reference to FIGS. 2 and 3.

In the measuring process, a measurement command signal and a measurement value signal based on a set value established by a measurement value setting device (not illustrated) are suplied from a central controller 32 to a motor controller 33 which controls the servomotor 28. Consequently, the servomotor 28 (shown by the same numeral in FIG. 1) is rotated in the normal direction to measure the molten resin. This state shows in FIG. 3(b).

On the other hand, when the measuring process is finished, the process proceeds to the injection process. In the injection process, an injection command signal and an injection speed command signal based on a set value established by an injection speed setting device 34 are supplied from the central controller 32 to a motor controller 36 controlling the servomotor 24 in response to the completion of closure of the mold (not shown). Thus, the servomotor 24 is rotated to move the screw 2 forward. At the same time, a detection signal of a tachometer generator 38 which is coupled with the motor 24 and detects a speed of the motor 24 is supplied to the motor controller 36 and closed-loop control is effected so that the detection signal is identical with the injection speed command signal.

At this time, a set signal for a reverse rotational speed of the screw which is previously established in a reverse rotational speed setting device 39 is supplied to the motor controller 33 and the servomotor 28 begins to be rotated reversely in accordance with the control method of the present invention. At the same time, a detection signal from a tachometer generator 40 coupled with the motor 28 is supplied to the motor controller 33 and closed-loop control is effected so that the detection signal is identical with the reverse rotational speed set value. In other words, as shown in FIG. 3(b), the screw 2 is rotated in a direction reverse to the rotational direction in the measuring process. Thus, in the injection process, the screw 2 is moved forward at the set speed and is reversely rotated at a predetermined set speed r. The apparent position of the ridge 2h of the screw 2 in a predetermined position of the heating cylinder 11 is set to become stationary.

In the above example, the reverse rotational speed of the screw 2 is previously set in the reverse rotational speed setting device 39, while a microprocessor may be used as the central controller 32 and may automatically calculate the reverse rotational speed on the basis of the set value of the injection speed setting device 34. More particularly, when a pitch of the screw 2 is L (mm), the injection (forward moving) speed of the screw 2 is Vs (mm/second) and the reverse rotational speed of the screw 2 is r (rotation/sec), the reverse rotational speed r may be calculated so that the following equation is satisfied:

$$r \geq Vs/L$$

preferably $r = Vs/L$.

Consequently, the apparent position of the ridge 2h of the screw 2 in the predetermined position of the heating cylinder 11 becomes stationary.

Further, a position sensor 50, for example, which detects the apparent position of the ridge 2h of the screw 2 in the axial direction may be provided and the predetermined reverse rotational speed r may be feedback-controlled so that the apparent position is substantially constant upon injection.

The range of reversely controlling the screw 2 preferably corresponds to the whole stroke of the forward-movement of the screw 2, while it may correspond to a part of the stroke if necessary. Furthermore, as shown by phantom line Vm of FIG. 3, when the injection speed (speed of the motor for injection) is varied in multi-steps, the predetermined reverse rotational speed r of the screw may be varied in multi-steps correspondingly. While the foregoing exemplifies the injection process, the above control is not limited to application in the injection process and it can be applied similarly to the case where the screw 2 is moved forward in other processes.

On the other hand, in the injection process, a detection signal of a pulse generator 35 coupled with the servomotor 24 is supplied to the central processor 32 in response to the forward movement of the screw 2. Thus, when the screw 2 is moved to a position corresponding to a set value of a holding pressure change-over position set device 41, the central controller 32 supplies a holding pressure control signal to the servomotor 24 so that the servomotor 24 changes from a speed control state to a holding pressure control state (injection pressure control state) and at the same time the controller 32 supplies a reverse control stop signal to the motor controller 33 to stop the rotation of the servomotor 28. The holding pressure control signal is previously set by a holding pressure set device 43. A detection signal of the load cell 18 which detects pressure is supplied to the central controller 32 through an amplifier 44 in the holding pressure control state and closed-loop control is effected so that the detection signal is identical with the holding pressure control signal. When an injection timer (not shown) is up and a predetermined injection time has elapsed, control signals for the servomotors 24 and 28 are turned off and the injection process is completely finished.

FIGS. 4(a) and (b) are graphs showing actually measured injection pressure P and injection speed V controlled by the method of the present invention. FIG. 4(a) shows data of the actually measured injection pressure (output of the load cell) P and FIG. 4(b) shows data of the actually measured injection speed V. Both data are plotted for 100 shots in overlapped manner with the abscissa being time. Four molded products each having a weight of about 0.2 (g) were obtained using a small acrylic lens having a total weight of about 5.6 (g) containing a spool and a runner.

Figure 4:
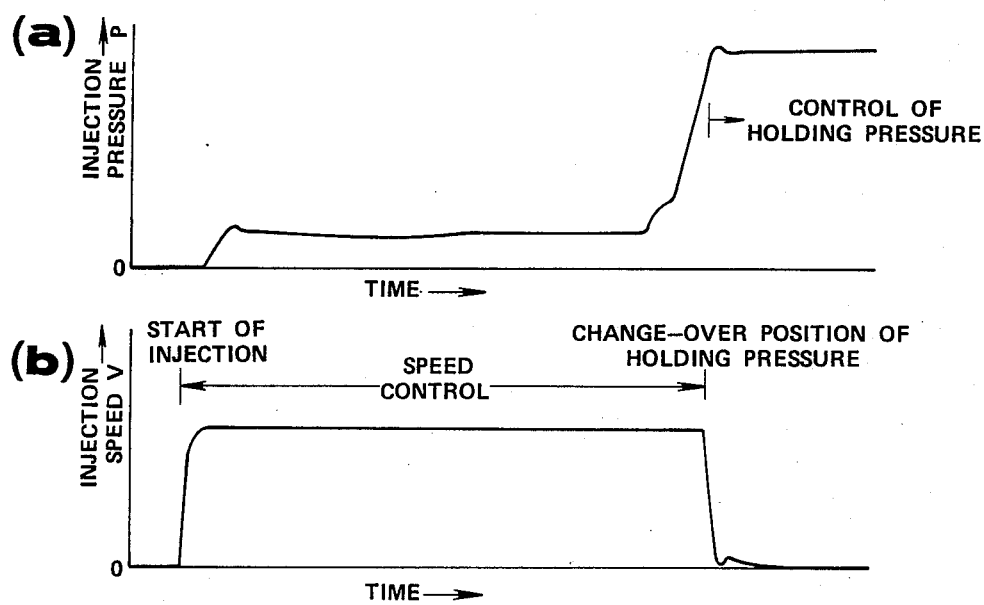
FIGS. 4(a) and 4(b) are graphs showing measured injection pressure and injection speed controlled by the control method according to the present invention, respectively.
Figure 5:
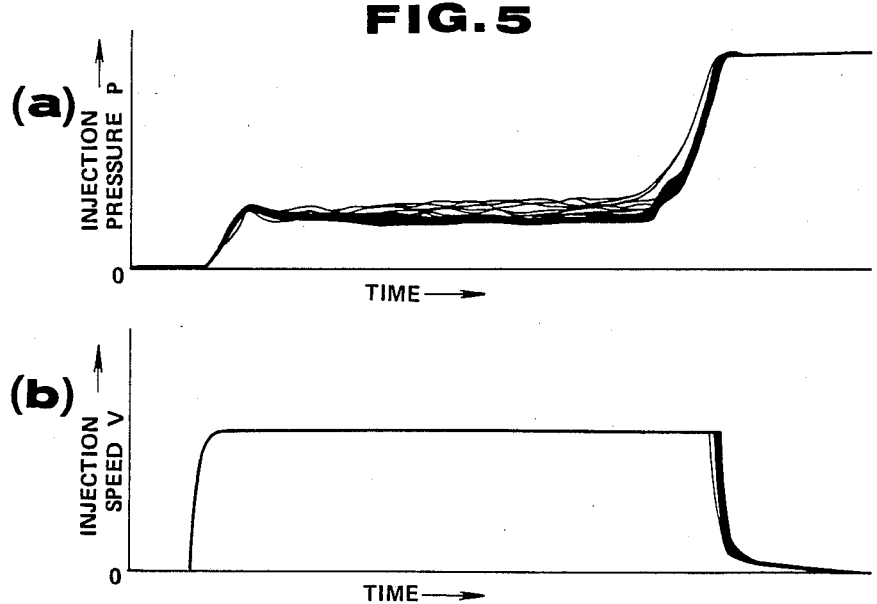
FIGS. 5(a) and 5(b) are graphs showing measured injection pressure and injection speed controlled by a conventional control method.

FIGS. 5(a) and (b) are graphs similar to those of FIG. 4 showing actually measured data controlled by a conventional method in which the screw 2 is not rotated upon injection. FIG. 5(a) shows data of the actually measured injection pressure P and FIG. 5(b) shows data of the actually measured injection speed V. Both data are plotted for 30 shots in overlapped manner with the abscissa being time.

In the measured results, the conventional control method had variation in weight of about 10 to 16 (mg) in respect to the total weight of 5.6 (g) and obtained two inferior molded products even when the molding for 30 shots was made, whereas the method of the present invention had small variation in weight of 4.3 (mg) in respect to the total weight of 5.6 (g) and obtained molded products all having good quality regardless of the molding for 100 shots.

As apparent from the comparison of FIGS. 4(a) and 5(a), in the present invention, variation in the injection pressure under control of the injection speed is reduced to about one sixth of that of the conventional method and is about 0.4 (%) in the rated injection pressure. Accordingly, the method of the present invention is more effective in the case where it is applied to an injection molding machine of a type that the holding pressure is changed over after the injection pressure has reached a predetermined value. Further, according to the present invention, it can be expected that a viscosity of molten resin in the heating cylinder can be reduced and a ring valve (check valve) disposed in the front of the screw can be easily closed.

While the embodiment has been described in detail, the present invention is not limited to such an embodiment and configuration, form, technique, numerical values, quantity and the like can be modified without departing from the spirit and the scope of the present invention. Particularly, the motor-driven type injection molding machine is described in the embodiment, while the present invention can be applied to a hydraulic injection molding machine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A control method for an in-line injection molding machine having a screw in a heating cylinder provided with a hopper, the control method comprising the steps of:

feeding material from the hopper to the screw;
   rotating the screw in one of a forward and reverse direction;
   moving the screw forward and backward in the heating cylinder;

setting a predetermined speed for reverse rotation of the screw during an injection process when the screw is moved forward by the equation:

$$r = Vs/L$$

wherein
r is the predetermined speed,
Vs is a forward speed of the screw, and
L is a pitch of the screw,
detectng an apparent position of a ridge of the screw in an axial direction for a predetermined position of the heating cylinder,
whereby the apparent position of the ridge of the screw remains generally stationary relative to the heating cylinder during forward movement of the screw during the injection process in response to the setting.

2. The control method for an injection molding machine according to claim 1, wherein the predetermined speed is varied with respect to the forward moving speed of the screw.

3. The control method for an injection molding machine according to claim 1, further comprising the step of:
effecting a feedback control whereby the apparent position of the ridge of the screw becomes generally stationary relative to the predetemined position by using results of the detecting.

* * * * *